US012741348B2

(12) United States Patent
Köchl et al.

(10) Patent No.: US 12,741,348 B2

(45) Date of Patent: Sep. 22, 2026

(54) SYSTEM FOR MACHINING WORKPIECES, MACHINE TOOL, SUPPORT DEVICE AND WORKPIECE SUPPORT

(71) Applicant: DECKEL MAHO Pfronten GmbH, Pfronten (DE)

(72) Inventors: Roland Köchl, Pfronten (DE); Johannes Pitterle, Vils (AT)

(73) Assignee: DECKEL MAHO Pfronten GmbH, Pfronten (DE)

( * ) Notice: Subject to any disclaimer, the term of this patent is extended or adjusted under 35 U.S.C. 154(b) by 427 days.

(21) Appl. No.: 18/285,644

(22) PCT Filed: Feb. 15, 2022

(86) PCT No.: PCT/EP2022/053653

§ 371 (c)(1),
(2) Date: Oct. 4, 2023

(87) PCT Pub. No.: WO2022/214230

PCT Pub. Date: Oct. 13, 2022

(65) Prior Publication Data

US 2024/0181582 A1 Jun. 6, 2024

(30) Foreign Application Priority Data

Apr. 8, 2021 (DE) ......................... 102021108803.8

(51) Int. Cl.

| | |
|---|---|
| ***B23Q 3/08*** | (2006.01) |
| ***B23Q 1/00*** | (2006.01) |
| ***B23Q 17/00*** | (2006.01) |

(52) U.S. Cl.

CPC ........... *B23Q 3/082* (2013.01); *B23Q 1/0027* (2013.01); *B23Q 17/003* (2013.01); *B23Q 17/005* (2013.01); *B23Q 2220/004* (2013.01)

(58) Field of Classification Search

CPC .... B23Q 3/082; B23Q 1/0027; B23Q 17/005; B23Q 17/00; H10P 72/7604; H10P 72/14; H10P 72/0606

See application file for complete search history.

(56) References Cited

U.S. PATENT DOCUMENTS 5,725,205 A * 3/1998 O'Berg .................... B25H 1/00 269/37

7,905,472 B2 * 3/2011 Nakano .................. H02G 11/00 269/61

(Continued)

FOREIGN PATENT DOCUMENTS

EP 1522377 A1 5/2007

JP 2001096436 A 4/2001

(Continued)

OTHER PUBLICATIONS

Office Action issued in correlated Japanese Application No. JP 2023-557674, issued Dec. 12, 2024, with translation.

*Primary Examiner* — Lee D Wilson

(74) *Attorney, Agent, or Firm* — Mindful IP PLLC

(57) ABSTRACT

A system for machining workpieces includes a machine tool including a support device including a receiving device for workpiece supports. The receiving device is configured to rotate about an axis of rotation with respect to a base of the machine tool. The system includes a workpiece support which can be fastened to the receiving device and has a clamping device, via which a workpiece is fastened. The workpiece support includes a monitoring device to monitor a state of stress of the clamping device. The support device and the workpiece support are electrically coupled via a contactless information transmission interface such that the monitoring device can transmit information about the state of stress monitored during the workpiece machining to the support device. The support device and the workpiece (Continued)

support are configured to be coupled to one another via an energy transmission interface for the transmission of hydraulic and/or pneumatic energy.

19 Claims, 4 Drawing Sheets

(56) References Cited

U.S. PATENT DOCUMENTS

| | | | | |
|---|---|---|---|---|
| 11,901,214 | B2 * | 2/2024 | Park | H10P 72/78 |
| 11,990,322 | B2 * | 5/2024 | Bae | H01J 37/32724 |
| 12,170,217 | B2 * | 12/2024 | Chihaya | H10P 72/722 |
| 12,347,719 | B2 * | 7/2025 | Sovenahalli | H10P 72/7612 |
| 12,358,090 | B2 * | 7/2025 | Kühne | B23Q 7/005 |
| 2005/0078012 | A1 | 4/2005 | Bercher et al. | |

FOREIGN PATENT DOCUMENTS

| | | | |
|---|---|---|---|
| JP | 2016144857 | A | 8/2016 |
| JP | 2019500223 | A | 1/2019 |
| WO | 2021018408 | A1 | 2/2021 |

* cited by examiner

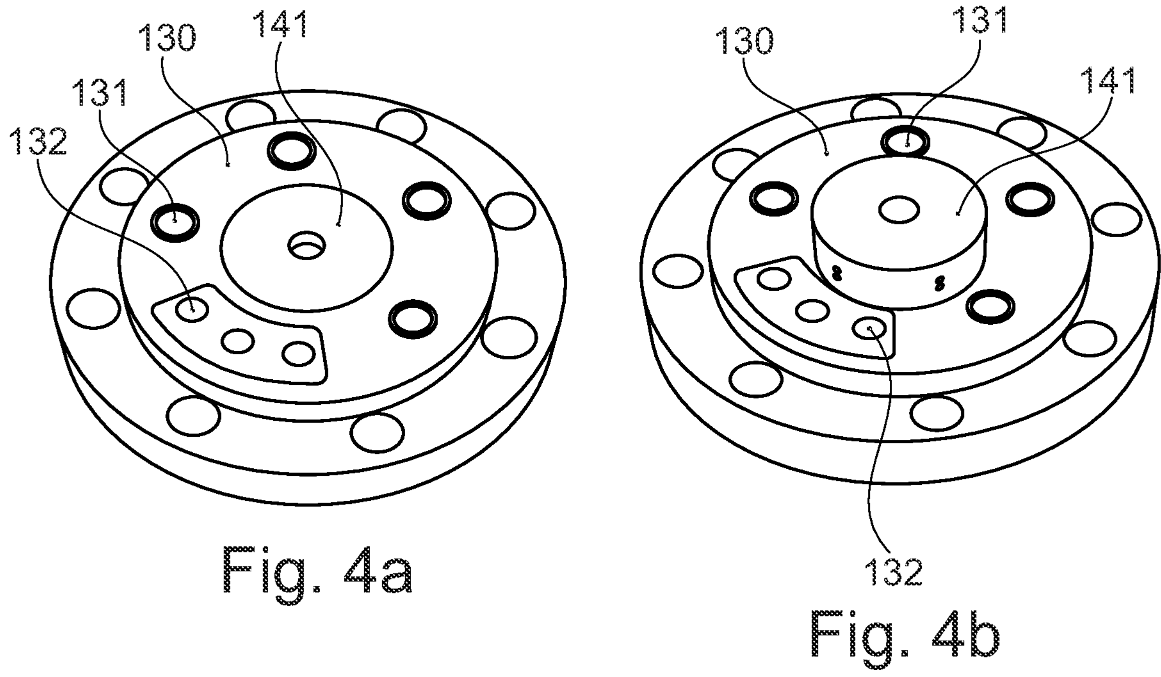
Fig. 4a
Fig. 4b
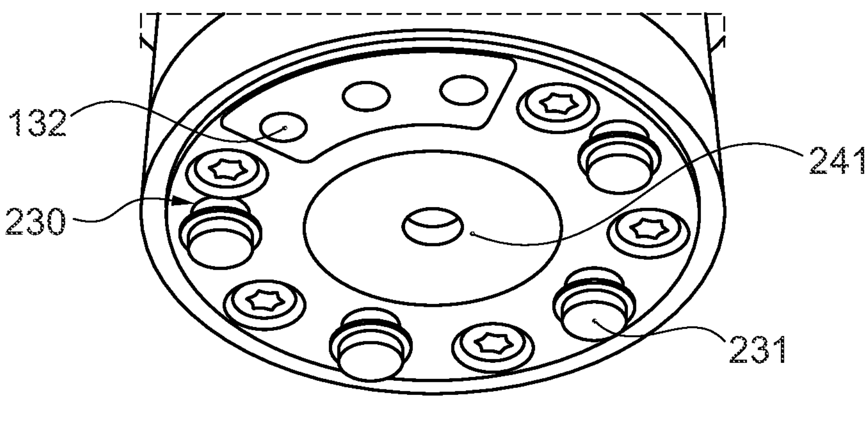
Fig. 4c

SYSTEM FOR MACHINING WORKPIECES, MACHINE TOOL, SUPPORT DEVICE AND WORKPIECE SUPPORT

CROSS-REFERENCE TO RELATED APPLICATIONS

This application is a US National Phase of International Patent Application Number PCT/EP2022/053653, filed Feb. 15, 2022, claiming priority to German Patent Application Number DE 10 2021 108 803.8, filed Apr. 8, 2021, the contents of each of which are incorporated by reference in their entireties into the subject matter of the present application.

TECHNICAL FIELD

The present disclosure relates to a system for machining workpieces, a machine tool for use in a system for machining workpieces, a support device for use in a machine tool and a workpiece support for use in a system for machining workpieces.

BACKGROUND

When machining workpieces using a machine tool, tools and the workpieces to be machined by them are moved relative to one another in order to machine the workpiece, for example in the course of milling and/or turning operations.

The workpiece is usually fixed or clamped on a workpiece support, wherein the machine tool usually comprises a plurality of drive devices for implementing relative movements between the workpiece support and a machining device carrying the tool, e.g., a work spindle, said drive devices making both translatory and rotary movements of workpiece support and/or machining device possible.

From the prior art, so-called rotary milling tables are known for this purpose, which enable the workpiece support to rotate about an axis of rotation in order to make possible not only milling with a stationary workpiece support but also turning with a rotating workpiece support including the workpiece clamped thereon.

The rotational speeds usually required for turning are comparatively high, which results in correspondingly high safety requirements during operation, which, among other things, require reliable clamping of the workpiece on the workpiece support and monitoring of the state of stress of the workpiece clamped on the workpiece support. Implementation thereof is made even more difficult due to the connection between the rotary milling table and the workpiece support, which is usually detachable, and the rotational movement of the rotary milling table that takes place during operation relative to a fixed base of the machine tool.

It is known from the prior art that different sensors and/or actuators may be arranged on the workpiece support for this purpose, which are coupled without contact to the milling turntable via a transmission interface in order to transmit electrical energy and/or information in the form of electrical signals between workpiece supports and rotary milling table.

EP 1 522 377 A1 shows a rotatable rotary milling table with a contactless inductive (or capacitive) transmission of electrical energy from the rotary milling table to a workpiece support attached thereto for the purpose of information transmission and for supplying energy to actuators arranged there for interaction with a clamped workpiece.

The contactless transmission of electrical energy is largely low wear, but limits the possibilities of the sensors and/or actuators that can be used on the workpiece support, which in turn may have a negative effect on operational safety, e.g. in the event of a failure of the electrical energy transmission.

SUMMARY

Therefore, it is an object of the present disclosure to provide an improved system for machining workpieces, in particular for milling and turning a workpiece, which ensures increased operational reliability while having a compact structure.

To achieve this object, a system for workpiece machining, in particular for milling and turning, according to an independent claim, a machine tool for use in a system for workpiece machining according to a dependent claim, a support device for use in a machine tool according to another dependent claim and a workpiece support for use in a system for machining workpieces according to another dependent claim are proposed.

Additional dependent claims relate to preferred examples of the system according to the disclosure, which may be provided individually or in combination.

According to a first aspect of the disclosure, a system for machining workpieces is provided, comprising a machine tool with a support device, which comprises a receiving device for workpiece supports which is configured to be driven to rotate about an axis of rotation relative to a base of the machine tool when workpieces are being machined, and a workpiece support which is fastenable to the receiving device and has a clamping device which is used to fasten a workpiece to be machined to the workpiece support, wherein the workpiece support comprises a monitoring device configured to monitor a state of stress of the clamping device. The support device and a workpiece support attached to the receiving device are electrically coupled to one another via a contactless information transmission interface in such a way that the monitoring device of the attached workpiece support can transmit information about the state of stress monitored by the monitoring device, in particular when workpieces are being machined, to the support device via the information transmission interface. The support device and the workpiece support fastened to the receiving device are further configured to be coupled to one another via an energy transmission interface for the transmission of hydraulic and/or pneumatic energy between the support device and workpiece support.

The interfaces are to be understood as a combination of a part on the workpiece support side and a part on the support device side, between which, in the case of an established or existing coupling, electrical signals in both directions—for the information transmission interface—or hydraulic and/or pneumatic energy—for the energy transmission interface—can be transmitted, which can be used advantageously for the transmission of information and/or control commands and the provision of energy on the workpiece support.

The provision of hydraulic and/or pneumatic energy—at least in a coupled state—allows for the workpiece support to be supplied with energy via the energy transmission interface, which is to be understood as any supply of energy-consuming or energy-actuated devices on the workpiece support, e.g. the clamping device, wherein the hydraulic and/or pneumatic energy supply is carried out, for example, in the form of the provision of a hydraulic and/or pneumatic medium with a specific supply pressure or a specific volume flow via the energy transmission interface.

The interfaces are preferably configured such that both energy and the information can be transmitted bidirectionally, i.e., both from the side of the support device towards the workpiece support and vice versa.

An example of a workpiece support is a pallet with a clamping device mounted thereon for fastening a workpiece known from the field of machine tool construction. The clamping device may be detachably mounted on the pallet and the clamping device may be, for example, a multi-jaw chuck known from the field of turning.

The state of stress of the clamping device, which is monitored by the monitoring device of the workpiece support, provides information about the fastening of the workpiece on the workpiece support and may, for example, be specified based on a clamping force, a stress value or position or path information of clamping elements of the clamping device.

The system according to the disclosure for machining workpieces advantageously combines monitoring the state of stress of the workpiece fastened on the workpiece support including contactless information transmission via the information transmission interface with a hydraulic and/or pneumatic energy supply via the energy transmission interface.

Thus, there are two independent interfaces between the support device and the workpiece support, which may each be used in the course of different tasks when machining workpieces with the system according to the disclosure, thereby allowing for a task-specific use of the two interfaces when machining workpieces, in the course of which for any task to be performed or any function to be provided, a more advantageous interface may be used.

On the one hand, the electrical coupling via the information transmission interface is advantageous for monitoring the state of the workpiece support or its clamping device in the course of machining workpieces since the relevant information is transmitted reliably as electrical signals with usually relatively low power without contact, wherein the transmission means required for this and the supply or connection means leading from and/or to these, e.g. electrical lines, require comparatively little installation space.

On the one hand, the risk of failure due to wear and tear and thus the failure of state monitoring can be significantly reduced in this way, and on the other hand, due to the low power transmission—since information transmission usually requires relatively low voltages and currents—the load on the information transmission interface, e.g. in the form of thermal stress due to electrical load, can be significantly reduced, thereby, inter alia, increasing the reliability and service life of the information transmission interface.

In this way, the information transmission interface of the system for workpiece machining according to the disclosure advantageously implements a so-called black channel technology, in which all information relevant to the workpiece support (or also control commands) can be transmitted safely and reliably via a central information transmission interface, the so-called black channel, independently of the energy supply of the workpiece support.

Since typically only low-power electrical signals are used to transmit information and there is no simultaneous contactless energy transmission with high electrical power to supply energy to the workpiece support, as is the case, for example, in the case of the interface shown in EP 1 522 377 A1, disruptive interactions between electric currents of high and low power, which are a problem that is well known from the prior art in the case of contactless transmission, do not occur.

A risk of information relating to the state of stress of the clamping device being falsified by interactions can thus be significantly reduced in comparison to an interface of the device from EP 1 522 377 A1.

On the other hand, the pneumatic and/or hydraulic coupling is used via the energy transmission interface to supply energy to the workpiece support, thereby providing the workpiece support with a relatively safer and more reliable energy supply in comparison to a purely electrical energy supply.

Thus, in the case of the system for machining workpieces according to the disclosure, the electrical coupling for information transmission and the hydraulic and/or pneumatic coupling for energy supply of the workpiece support are used in an advantageous manner, which, in comparison to an interface for information and energy transmission configured purely electrically, as shown, for example, in EP 1 522 377 A1, the information transmission interface for the electrical coupling between the support device and workpiece support is only subjected to an extremely low load and, in addition, a hydraulic and/or pneumatic energy supply for the workpiece support that can be used independently and separately is available.

Furthermore, due to the coupling between the support device and the workpiece support being at least partially electrically implemented according to the disclosure, compared to a purely hydraulic coupling known from the prior art with one or more rotary feedthroughs, the installation space required for hydraulic and/or pneumatic supply lines and the like within the support device and within the workpiece support can be significantly reduced.

The energy transmission interface is preferably configured to be detachable. In this way, workpiece supports attached to the support device can be substituted or exchanged with relatively little effort, which in turn is advantageous in the context of automated workpiece machining in the context of mass production.

The clamping device of the workpiece support is preferably configured as a multi-jaw chuck with a plurality of clamping jaws as clamping means, wherein the multi-jaw chuck is configured to fasten and/or release the workpiece by displacing individual clamping jaws of the plurality of clamping jaws in a direction perpendicular to the axis of rotation of the support device.

In a particularly preferred example, the support device and the workpiece support may be coupled via the energy transmission interface in such a way that, in a coupled state, the clamping device of the attached workpiece support can be supplied with energy via the energy transmission interface, in particular with hydraulic and/or pneumatic energy.

The energy provided via the energy transmission interface can thus be used independently of the operations at the information transmission interface to actuate the clamping device of the workpiece support in order to fasten the workpiece on the workpiece support or to release it therefrom in turn.

In comparison to a purely electrical energy supply, as shown for example in EP 1 522 377 A1, a more secure and reliable attachment of the workpiece to the workpiece support via the clamping device is made possible since the use of hydraulic or pneumatic energy offers the advantage, inter alia, to apply very high forces for fastening or clamping via a comparatively simple structure, said forces in turn being essential for securely fixing the workpiece during turning operations with high rotational speeds. In addition, the state of stress in the clamping device can be adjusted and/or determined relatively easily via such an energy supply since the state of stress can be determined, for example, directly from the supply pressure provided at the energy transmission interface or from the pressure of the hydraulic and/or pneumatic medium applied at the clamping device.

Preferably, the clamping device of the workpiece support comprises one or more self-locking actuating devices for actuating the clamping device. In this way, even if the energy supply fails or is decoupled via the energy transmission interface, it is ensured that the workpiece remains fixed by the clamping device.

Self-locking may be implemented in such a way that, when the coupled state is released via the energy transmission interface, a hydraulic and/or pneumatic pressure applied to the actuating devices is kept constant. The hydraulic and/or pneumatic pressure applied does not, or at least not significantly, drop when the coupling via the energy transmission interface is released, but is maintained.

As an alternative or in addition to the self-locking actuating devices, the clamping device may comprise a mechanically designed locking device configured to block movements of clamping elements of the clamping device for fastening a workpiece at least in a state uncoupled via the energy transmission interface.

The design with a self-locking actuating device and/or mechanical locking device further increases operational safety.

In a particularly preferred example, the monitoring device for monitoring the state of stress comprises one or more sensor units from a group of sensor units, wherein the group of sensor units comprises a pressure sensor unit for detecting a hydraulic and/or a pneumatic pressure at the clamping device, an end position sensor unit for detecting an end position of the clamping device, in particular of clamping means of the clamping device for clamping the workpiece, a displacement sensor unit for detecting an displacement path of the clamping device, in particular the clamping means of the clamping device, and a force sensor unit for detecting a clamping force of the clamping device acting on the workpiece.

The large number of sensor units from the group of sensor units allows for comprehensive and application-specific monitoring of the state of stress, with the information sensed by the sensor units being transmitted by the monitoring device in the form of electrical signals, from the workpiece support to the support device, and from there, to be transmitted further to a control device of the machine tool for consideration in the machine control, for example.

If, for example, the monitoring device senses a state of stress that is insufficient for turning, the control device may react to this by reducing the rotational speed or even by immediately stopping the machine tool.

For most cases, in particular for hardly changing rotational speeds, an end position sensor, which detects an end position or end configuration of the clamping device with the workpiece fixed, is usually sufficient, whereas monitoring the clamping force proves to be particularly advantageous for changing rotational speeds, as this allows for more accurate statements about changes in the clamping forces that can be caused, for example, by the weight of the workpiece or centrifugal forces.

The monitoring device for monitoring the state of stress preferably comprises at least two different sensor units from the group of sensor units.

In this way, redundant monitoring of the state of stress including at least two different types of sensor units may be provided, thereby improving the monitoring of the state of stress and thus increasing operational reliability. In particular, the combination of the end position sensor unit relating to the mechanics and the pressure sensor unit relating to the energy supply is suitable.

In an example, the energy transmission interface in the coupled state is further configured to transmit electrical energy between the support device and the workpiece support fastened to the receiving device, in particular to supply energy to the clamping device of the fastened workpiece support.

As a result, for example, different clamping devices can be used on the workpiece support, part of which may also be electrically actuated depending on the configuration.

The use of electrical energy is not limited to supplying the clamping device, but may also be used for additional devices on the workpiece support that require an energy supply.

In an example, the support device is configured to establish and/or release a coupling between the support device and the fastened workpiece support via the energy transmission interface by relative movements between a part on the support device side and a part on the workpiece support side of the energy transmission interface.

In this way, the fastening of the workpiece support to the support device is independent of the energy transmission interface such that, after fastening to the receiving device, the coupling via the energy transmission interface can be established and/or released again at any time.

In an example, the support device is configured to establish and/or or to release the coupling between the support device and the fastened workpiece support via the energy transmission interface by translatory movements of the part of the energy transmission interface on the support device side in the direction of a movement axis, in particular in the direction of the axis of rotation of the receiving device.

In this way, a comparatively simple way of establishing the coupling via the energy transmission interface is provided. For example, the part on the support device side may be moved towards a lower side of the workpiece support by a lifting movement directed in the direction of the axis of rotation in order to establish the coupling there by docking with the part of the interface on the workpiece support side.

In an example, the system is configured in such a way that the coupling between the support device and the fastened workpiece support is released via the energy transmission interface while the workpiece is machined.

For example, to fasten the workpiece by means of the clamping device of the workpiece support fastened to the receiving device, in this case a coupling is established via the energy transmission interface so that the clamping device can be supplied with energy to actuate it. After the workpiece has been fastened by the clamping device, the coupling is released again, with the state of stress of the clamping device being maintained, after which the workpiece is machined with the coupling via the energy transmission interface being released.

In this way, the part of the energy transmission interface on the support device side is not connected to the workpiece support during workpiece machining so that it consequently does not have to follow the rotational movement of the workpiece support, which in turn considerably simplifies storage of the part on the support device side.

Preferably, the part of the energy transmission interface on the support device side substantially retains its position with respect to the base of the machine tool during a rotation of the receiving device when the workpiece is being machined.

In an example, the system is configured such that the coupling between the support device and the fastened workpiece support is established via the energy transmission interface while the workpiece is being machined.

In this case, the coupling via the energy transmission interface exists, for example, both during an actuation of the clamping device for fastening the workpiece, which is made possible by the energy supply, and during the subsequent machining of the workpiece.

In this way, not only the information transmission interface but also the energy transmission interface is available while the workpiece is being machined, with the part of the interface on the support device side rotating around the axis of rotation together with the fastened workpiece support. As a result, for example, the clamping device can be supplied with energy even while the workpiece is being machined, which means that the state of stress can be varied or readjusted, for example in the event that the monitoring device senses a drop in the clamping force while the workpiece is being machined.

Furthermore, additional monitoring of the state of stress on the side of the support device may advantageously be carried out by, for example, being able to sense an applied supply pressure of a hydraulic and/or pneumatic medium for the clamping device provided via the energy transmission interface even while the workpiece is being machined, thereby additionally increasing the operational reliability.

In an example, the support device, in particular the part of the energy transmission interface on the support device side, and the base of the machine tool are coupled to one another via a further energy transmission interface for the transmission of hydraulic and/or pneumatic and/or electrical energy in such a way that, while the workpiece is being machined, energy can be transmitted via the further energy transmission interface between the support device and the base, in particular for supplying energy to the clamping device via the energy transmission interface between the support device and the workpiece support.

In this way, an additional interface is provided that makes it possible to connect a part of the energy transmission interface on the support device side, even when it corotates with the workpiece support, to an energy supply source arranged on the side of the base of the machine tool so that a continuous supply of hydraulic and/or pneumatic energy can be provided by the energy supply source even during machining.

In an example, part of the further energy transmission interface is configured as a rotary feedthrough with a sealed transition between the support device and a hydraulic fluid supply and/or a gas supply and/or a vacuum supply arranged on the side of the base of the machine tool.

In this way, a configuration of the further energy transmission interface in the form of a rotary feedthrough that is reliable and established in the prior art is provided, which allows hydraulic and/or pneumatic energy to be transmitted between two components rotating relative to one another, which in this case allows for a reliable and fail-safe supply of the support device by means of an energy supply source on the side of the base of the machine tool in the form of a hydraulic fluid supply and/or a gas supply and/or a vacuum supply.

In an example, a part of the information transmission interface on the support device side substantially retains its position with respect to the base of the machine tool during the rotation of the receiving device while the workpiece is being machined.

Substantially retaining is to be understood here as meaning that while the workpiece is being machined, there are no changes in the position of the part on the support device side deliberately caused by displacement movements. Operational changes in position due to deformation or vibration of individual components are still possible.

It should be noted at this point that the base of the machine tool itself does not have to be fixed relative to the rest of the machine tool, but may also be moved or rotated via linear or rotary axes in order to position or align the support device connected to the base relatively with respect to a machining device of the machine tool, in particular with respect to a tool-carrying work spindle.

In an example, the part of the information transmission interface on the support device side and the part on the workpiece support side are each embodied as inductive couplers configured to inductively transmit information to one another in the form of electrical signals across an air gap.

The inductive transmission provides a transmission option which is contactless and therefore low-wear as well as safe and hardly failure-prone. This proves to be particularly advantageous for the transmission of safety-relevant information, such as information on the state of stress of the clamping device.

Preferably, the inductive coupler on the support device side is electrically coupled to a control device of the machine tool arranged on the side of the base of the machine tool such that, while the workpiece is being machined, information in the form of electrical signals can be transmitted between the support device and the control device, in particular information about the state of stress of the clamping device monitored by the monitoring device, said information being transmitted to the support device via the information transmission interface.

In an example, this coupling between the inductive coupler on the support device side and the control device is carried out via a second contactless information transmission interface configured, in particular, for inductive transmission.

In this way, the additional use of connecting cables and/or plug-in connections between the support device and the base is avoided, which allows for a clear structure, a compact design and easy replacement of individual parts or assemblies, e.g., during maintenance.

According to a second aspect of the disclosure, a machine tool for use in a system for machining workpieces according to the first aspect of the disclosure is provided.

According to a third aspect of the disclosure, a support device for use in a machine tool according to the second aspect of the disclosure is provided.

According to a fourth aspect of the disclosure, a workpiece support for use in a system for machining workpieces according to the first aspect of the disclosure is provided.

BRIEF DESCRIPTION OF THE DRAWINGS

Further aspects and their advantages as well as more specific examples of the aspects and features mentioned above are described below using the drawings shown in the attached figures:

FIGS. 4*a* to 4*c* show exemplary examples of the parts of the information and energy transmission interface of the support device and workpiece support that are on the workpiece support side and on the support device side.

DESCRIPTION

Identical or similar elements in the figures may be denoted by the same reference symbols, but sometimes also by different reference symbols.

It is emphasized that the present disclosure is not limited to the examples described below and their implementation features. The disclosure also includes modifications of the examples mentioned, in particular those resulting from modifications and/or combinations of one or more features of the examples described within the scope of the independent and dependent claims.

Figure 1:
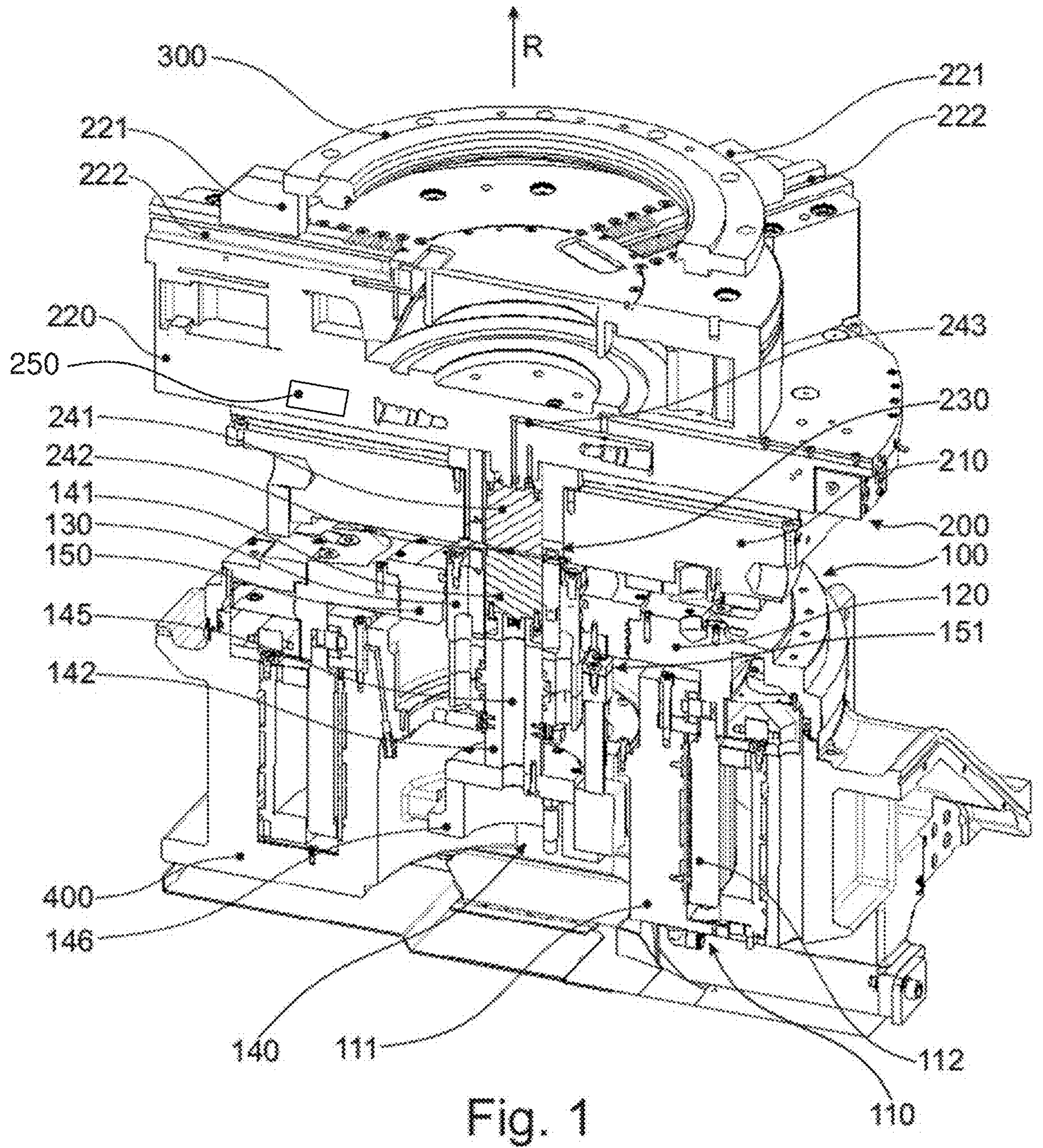
FIG. 1 shows a perspective detail view of an example according to the first aspect of the disclosure including a workpiece support with a clamping device, a support device and a base of a machine tool.

FIG. 1 shows a perspective detail of an example according to the first aspect of the disclosure including a workpiece support 200 with a clamping device, a support device 100 and a base 400 of a machine tool.

The structure shown shows a rotary milling table, with the aid of which a workpiece 300 carried by the workpiece support 200 can be rotated about an axis of rotation R running vertically when the workpiece is being machined. A rotation about the axis of rotation R may be carried out both as part of a milling workpiece machining, in which an angular reorientation of the ring-shaped workpiece 300 by a specific angular value about the axis of rotation R is carried out, and in the context of turning workpiece machining, in which the workpiece support 200 rotates together with workpiece 300 about the axis of rotation R at a fixed rotational speed. This results in comparatively high requirements for fastening the workpiece 300 on the workpiece support 200.

The workpiece support 200 comprises a pallet 210 and a jaw chuck 220, which is mounted on the top of the pallet 210, as a clamping device for fastening the workpiece 300.

The jaw chuck 220 shown in FIG. 1 is a three-jaw chuck with three clamping jaws 221 (one of which is not shown due to the sectional view), which can be displaced along respective guide grooves 222 in a direction radial to the axis of rotation R so as to attach the workpiece 300 to the workpiece support 200 and fix it securely.

The workpiece support 200 is detachably connected to the support device 100 of the machine tool on a lower side of the pallet 210 so that the entire workpiece support 200, i.e., the pallet 210 and the jaw chuck 220, along with the workpiece 300, can be exchanged or replaced quickly and easily within the scope of automated industrial production.

The workpiece support 200 may be supplied with a hydraulic medium for energy supply when it is mounted on the support device 100 in order to actuate the jaw chuck 220 for the purpose of fastening or releasing the workpiece 300.

For workpiece machining, the pallet 210 of the workpiece support 200 is fastened to a pallet support 120 of the support device 100 of the machine tool, which is configured as a receiving device, the fastening being affected via clamping cones of the pallet support 120, which are not shown in the selected perspective.

For the rotational drive of the workpiece support 200 fastened to the pallet support 120, the pallet support 120 is connected to the rotor 112 of an electric drive motor 110, the stator 111 of which is arranged on the side of the base 400 of the machine tool. When the rotor 112 rotates relative to the stator 111 about the axis of rotation R, the pallet support 120 and the fastened workpiece support 200 also rotate together with the workpiece 300.

The pallet support 120 of the support device 100 is supplied with a hydraulic medium via a non-rotating distributor flange 150 in order to actuate the clamping cones for fastening the workpiece support 200. The distributor flange 150 may be connected to or also be separated from a hydraulic supply of the machine tool via a hydraulic coupling 151 that can be displaced in the direction of the axis of rotation R.

The workpiece support 200 and thus also its jaw chuck 220 is supplied with hydraulic energy via a centrally arranged energy transmission interface in order to actuate in this way, inter alia, the clamping jaws 221 of the jaw chuck 220 in order to firmly clamp the workpiece 300 or to release it again from the jaw chuck 220 after machining has taken place.

On the side of the support device 100, the energy transmission interface comprises a media coupler 130, which can be coupled to a receptacle 230 on the side of the workpiece support in order to enable media transfer of a hydraulic medium between the support device 100 and the workpiece support 200 so that, for example, a specified hydraulic supply pressure to actuate the clamping jaws 221 can be provided.

In the illustration shown, the energy transmission interface is detached so that there is no coupling via said interface. To establish a coupling via the energy transmission interface—in order to supply the jaw chuck 220 with energy, among other things—the media coupler 130, starting from the configuration shown in FIG. 1, is displaced towards the workpiece support 200 by a lifting movement aimed in the direction of the axis of rotation R in order to dock to the receptacle 230 there.

Before starting the workpiece machining, the media coupler 130 is lowered back into the configuration shown in FIG. 1, whereby the coupling via the energy transmission interface is released. The workpiece support 200 is configured such that when said coupling is released, the hydraulic pressure previously present in a hydraulic network of the workpiece support 200 is maintained and does not drop, or at least does not drop significantly.

In the exemplary example shown, the media coupler 130 is configured such that it does not rotate about the axis of rotation R when the workpiece support 200 is rotated while the workpiece is being machined, but rather maintains its position relative to the base 400.

The media coupler 130, which can be displaced in the direction of the axis of rotation R, is arranged around an inner structure 140 which is stationary with respect to the base 400 and which comprises a pot 146 on the lower side, a piston 142 attached thereto and a first inductive coupler 141 connected thereto. Here, the media coupler 130 has a cylindrical recess which encloses part of the inner structure 140 in such a way that the media coupler 130 is mounted so as to be displaceable in the direction of the axis of rotation R. In order to eliminate the remaining degree of rotational freedom of the media coupler 130 relative to the inner structure 140, it is also connected to the piston 142 via torque supports (see FIG. 2).

Between the piston 142 and the media coupler 130, a lifting hydraulic system is arranged (see FIG. 2), via which a displacement of the media coupler 130 in the direction of the axis of rotation R is implemented for the purpose of establishing or releasing the coupling via the energy transmission interface.

The piston 142 itself has a cylindrical recess as a cable feedthrough 145 on the inside, through which supply or transmission cables are routed from the base 400 to the first inductive coupler 141.

The first inductive coupler 141 is part of an information transmission interface between the support device 100 and the workpiece support 200, which serves to transmit information in the form of electrical signals.

The information transmission interface consists of the first inductive coupler 141 on the support device side and a second inductive coupler 241 on the workpiece support side which are configured to inductively transmit information to one another via an air gap 242 in the form of electrical signals.

The first inductive coupler 141 is fixed relative to the base 400 while the workpiece is being machined, whereas the second inductive coupler 241 is arranged in a central recess of the pallet 210 and rotates along with the rest of the workpiece support 200 while the workpiece is being machined, so that the first 141 and second inductive couplers 241 rotate relative to each other, while they are not in contact, but separated from each other via the air gap 242. The inductive transmission via said interface thus offers a low-wear option to provide an electrical coupling between the workpiece support 200 and the support device 100 despite relative movement or relative rotation of the two couplers 141, 241, even while the workpiece is being machined.

The second inductive coupler 241 is connected, via connecting means running in connecting channels 243, to a monitoring device 250 of the workpiece support 200, which is configured to monitor a state of stress of the jaw chuck 220 and to transmit related information via the information transmission interface, primarily for the purpose of forwarding to a control device (not shown here) of the machine tool. The monitoring device 250 may generally be provided both as part of the clamping device or the jaw chuck 220 and as a separate device of the workpiece support 200.

Due to the structure described above, a safety-related monitoring of the state of stress can also take place while the workpiece is being machined, so that, in the event of an insufficiently secure or even loosening fastening, the control device may be configured, for example, to immediately stop the rotation of the workpiece support.

In the exemplary example shown in FIG. 1, the workpiece support 200 or its jaw chuck 220 is supplied with energy hydraulically, while safety-relevant information regarding the state of stress of the jaw chuck 220 is transmitted electrically via the contactless information transmission interface in the center of the support device 100 and the workpiece support 200.

In this way, the optimal transmission variant for the respective task is selected since hydraulically provided energy is optimally suited for actuating the clamping device and the inductive and contactless transmission is optimally suited for transmitting information (especially safety-relevant information) since it is particularly fail-safe and also particularly robust against interference when the power of the electrical signals to be transmitted is low.

Figure 2:
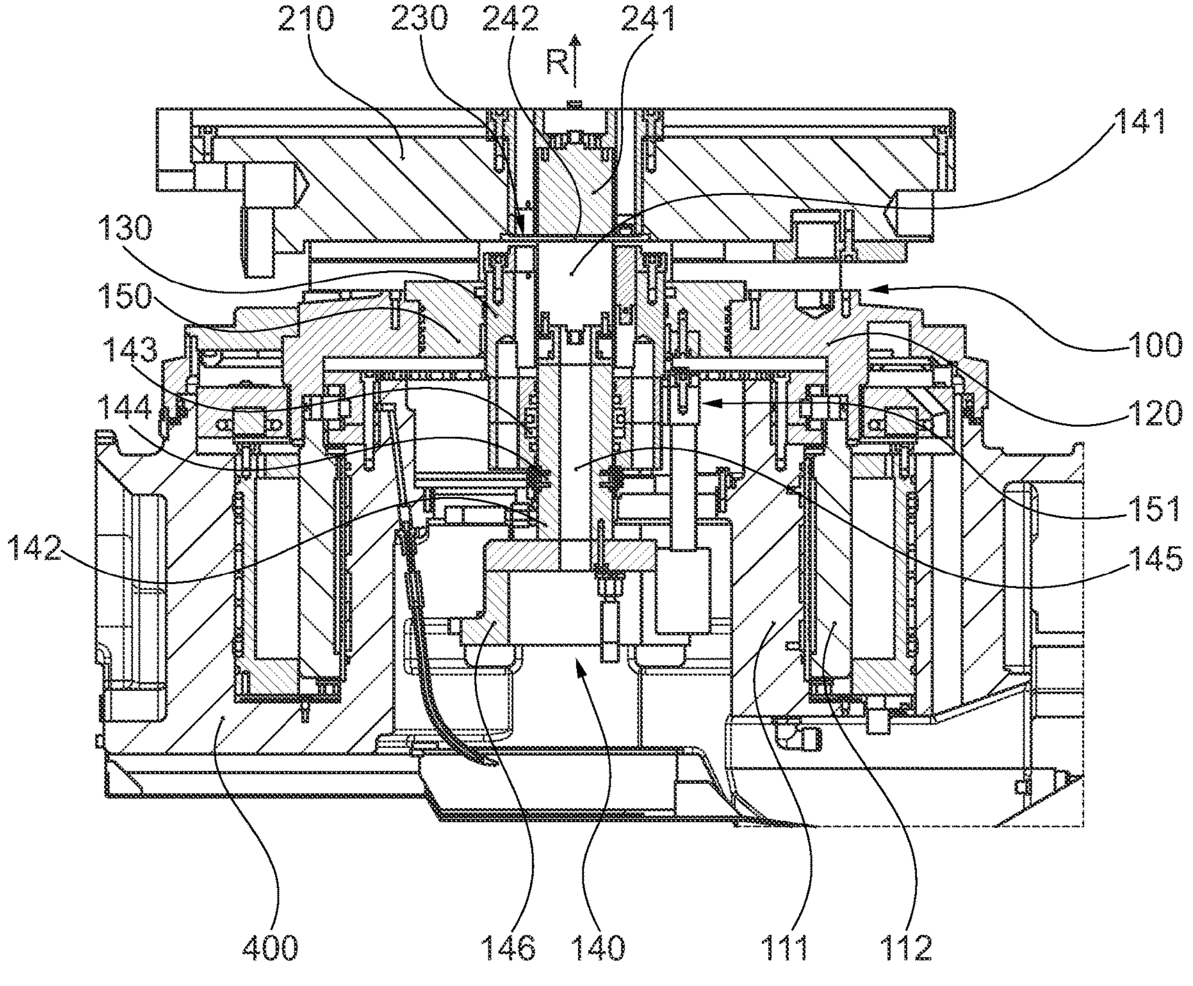
FIG. 2 shows a two-dimensional sectional view of the example of FIG. 1 without clamping device of the workpiece support.

FIG. 2 additionally shows a two-dimensional sectional view of the exemplary example from FIG. 1, which, for the sake of clarity, does not show a clamping device or a jaw chuck 220 of the workpiece support 200.

As a supplement to the illustration in FIG. 1, the sectional view in FIG. 2 mainly shows the previously described structure of the support device 100 of the example of the system according to the disclosure.

In particular, FIG. 2 shows the lifting hydraulic system 143 between the piston 142 and the media coupler 130 for moving the media coupler 130 in the direction of the axis of rotation R, as well as the torque supports 144 used to support the media coupler 130 between the media coupler 130 and the piston 142.

The lifting hydraulics 143 are implemented by two hydraulic chambers, each of which are delimited between a radially protruding piston extension of the piston 142 that extends into a recess of the media coupler 130 and the media coupler 130. Seen in the direction of the axis of rotation R, there is a first hydraulic chamber below the piston extension and a second hydraulic chamber (not filled here) above the piston extension. Starting from the configuration shown in FIG. 2, the media coupler 130 may be displaced axially upwards in the direction of the axis of rotation R by filling the second hydraulic chamber and emptying the first hydraulic chamber, so that, in this way, the media coupler 130 docks to the receptacle 230 of the workpiece support or the palette 210 and a coupling is established via the energy transfer interface.

Figure 3:
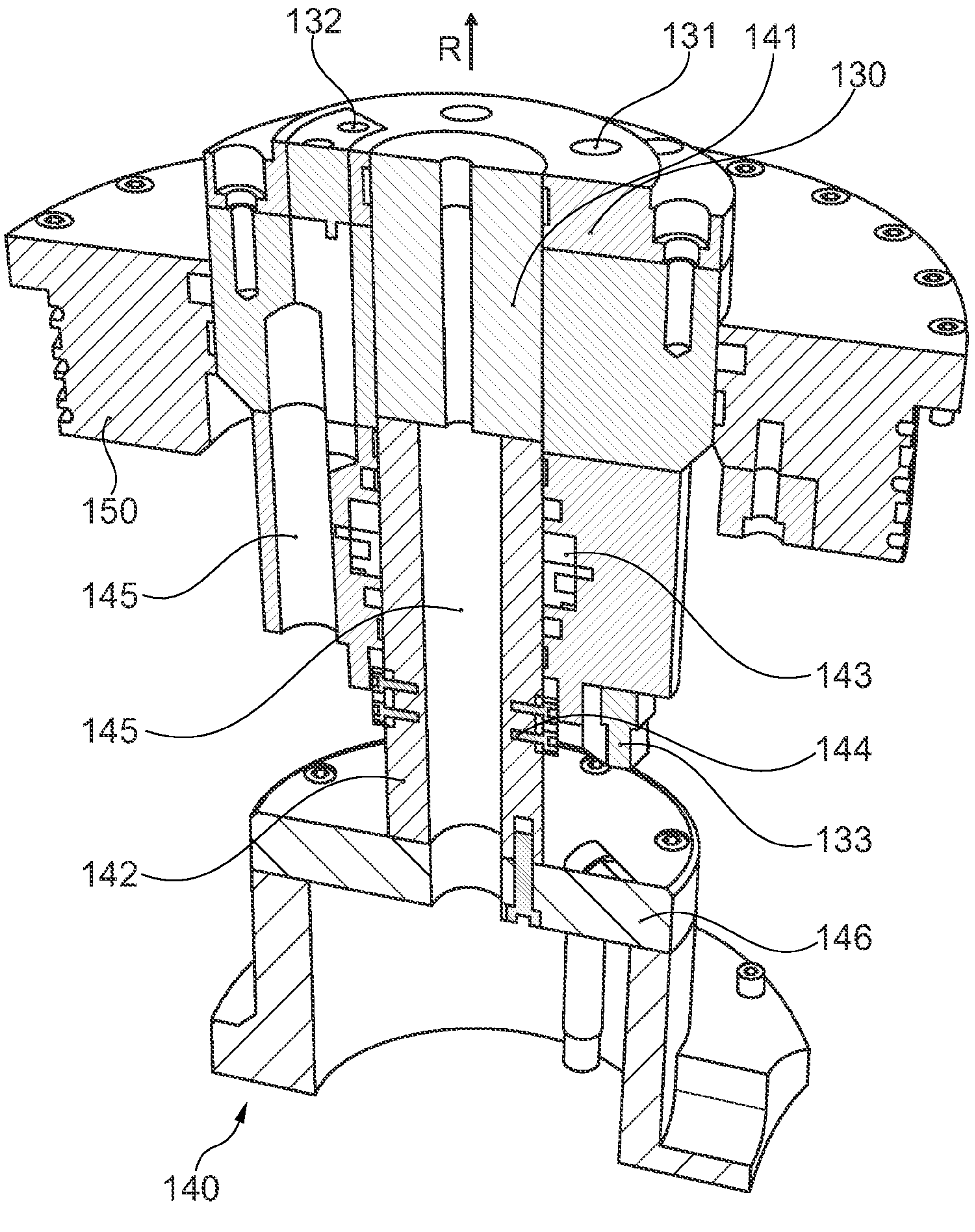
FIG. 3 shows a perspective view of an example of a support device according to the third aspect of the disclosure.

FIG. 3 shows a perspective view of part of an example of a support device according to the third aspect of the disclosure, but without a receiving device for a workpiece support, wherein the structure shown essentially corresponds to that of the support device already described in FIGS. 1 and 2.

FIG. 3 shows an internal structure 140 of the support device, which includes a pot 146, a piston 142 attached thereto and an inductive coupler 141 in turn attached thereto as part of an information transmission interface between the support device and an attachable workpiece support rotatable about the axis of rotation R (not shown here).

A media coupler 130 as part of an energy transmission interface between the support device and the workpiece support attached to it is mounted such that it can be displaced with respect to the inner structure 140 in the direction of the axis of rotation R in order to establish or release a coupling to an attached workpiece support for the transmission of hydraulic and electrical energy by displacement. Torque supports 144 between the piston 142 and the media coupler 130 prevent the media coupler 130 from rotating relative to the inner structure 140.

A lifting movement for the axial displacement of the media coupler 130 is carried out via a lifting hydraulic system 143, the operating principle of which has already been described in relation to FIG. 2.

In the configuration shown in FIG. 3, the media coupler 130 is in a position suitable for docking to the workpiece support, with the second hydraulic chamber (top) now being filled and the first hydraulic chamber (bottom) of the lifting hydraulics 143 being empty.

Energy transfer between the media coupler 130 and the matching counterpart on the side of a workpiece support is carried out via the couplings 131 arranged on the upper side for media transfer, with which a hydraulic medium (or alternatively a pneumatic medium) can be mutually exchanged. In addition, a further energy transmission interface in the form of several electrical pins 132 for the transmission of high-power electrical energy—at least higher than that of the electrical signals transmitted via the information transmission interface—is arranged on the upper side of the media coupler 130.

Energy supply to the media coupler 130 is carried out via terminals 133 for media supply arranged on the lower side, which may be connected to a hydraulic fluid supply (not shown here) and/or a gas supply and/or a vacuum supply. Electrical energy is supplied via connecting means (not shown here) which run below the electrical pins 132 in cable feedthroughs 145 and are connected to an electrical energy source (also not shown here).

With the (at least partially) illustrated support device, a workpiece support attached thereto can thus be supplied both with hydraulic and/or pneumatic energy via the energy transmission interface and with electrical energy via the further energy transmission interface, whereas information can be transmitted via the centrally arranged first inductive coupler 141 with a counterpart on the workpiece support side.

FIGS. 4*a* and 4*b* show enlarged views of the parts of the energy and information transmission interface of the example shown in FIG. 3 on the side of the support device in a perspective plan view, each in a position corresponding to a coupled state in FIG. 4*a* and in a position corresponding to an uncoupled state in FIG. 4*b*.

The media coupler 130 forms the part of the energy transmission interface on the support device side which can provide, in a state coupled to the workpiece support or its receptacle 230, a hydraulic and/or pneumatic medium for supplying energy to the workpiece support via the four couplings 131 arranged around the circumference for media transfer.

Furthermore, there is a further energy transmission interface with three electrical pins 132 arranged on a partial circumference on the upper side of the media coupler 130, via which, in the coupled state, electrical energy can be provided for the energy supply of the workpiece support.

The first inductive coupler 141 of the information transmission interface is arranged centrally so as to be surrounded by the media coupler 131.

In comparison to FIG. 4*b*, FIG. 4*a* shows the position of the media coupler 130 in a state coupled to the workpiece support or to its receptacle 230. The first inductive coupler 141 is fixed with respect to a base of the machine tool (not shown here), wherein the media coupler 130 is displaced axially upwards relative to the first inductive coupler 141 to establish a coupling and axially downwards to release the coupling. FIG. 4*a* shows the position displaced upwards, while FIG. 4*b* shows the position of the media coupler 130 displaced downwards.

FIG. 4*c* shows an example of counterparts on a workpiece support that match the parts of the relevant interfaces on the support device side shown in FIGS. 4*a* and 4*b*.

In order to establish a coupling via the energy transmission interface, the workpiece support has a receptacle 230 on the lower side for the media coupler 130 shown in FIGS. 4*a* and 4*b*, wherein the receptacle 230 has four coupling nipples 231 distributed over the circumference which are configured to couple the couplings 131 for media transfer shown in FIGS. 4*a* and 4*b* in order to establish a hydraulic and/or pneumatic network between the support device and the workpiece support, via which the workpiece support is supplied with energy.

Furthermore, three electrical pins 132 distributed over a partial portion of the circumference are arranged in the area of the receptacle 230 as part of the further energy transmission interface, wherein an electrical coupling for the transmission of electrical energy of comparatively high power between the support device and the workpiece support can be achieved vie said electrical pins 132.

Surrounded by the receptacle 230 for the media coupler 130, the second inductive coupler 241 matching the one shown in FIGS. 4*a* and 4*b* is arranged in the center, wherein said second inductive coupler 241 can be used in conjunction with the first inductive coupler 141 as an information transmission interface, regardless of a position of the media coupler 130 and thus independent of a coupling via the energy transmission interface(s) (cf. configurations in FIGS. 4*a* and 4*b*).

Examples of the present disclosure and advantages thereof have been described in detail above with reference to the attached figures.

It is again emphasized that the present disclosure is in no way limited to the examples described above and their implementation features. The disclosure also includes modifications of the examples mentioned, in particular those resulting from modifications and/or combinations of one or more features of the examples described within the scope of the independent claims.

LIST OF REFERENCE SYMBOLS

- 100 support device
- 110 drive motor
- 111 stator
- 112 rotor
- 120 pallet support
- 130 media coupler
- 131 couplings for media transfer
- 132 electrical pin
- 133 terminals for media supply
- 134 cable feedthrough for current supply of the electrical pins
- 140 inner structure
- 141 first inductive coupler
- 142 piston
- 143 lifting hydraulics
- 144 torque support
- 145 cable feedthrough
- 146 pot
- 150 distributor flange
- 151 hydraulic coupling for distributor flange
- 200 workpiece support
- 210 pallet
- 220 jaw chuck
- 221 clamping jaw
- 222 guide groove
- 230 receptacle for media coupler
- 231 coupling nipple
- 241 second inductive coupler
- 242 air gap
- 243 connection channels
- 300 workpiece
- 400 base of the machine tool
- R axis of rotation

What is claimed is:

1. A system for machining workpieces, comprising:

a machine tool including a support device comprising a receiving device for workpiece supports, the receiving device being configured to be driven to rotate about an axis of rotation with respect to a base of said machine tool during a course of workpiece machining;

a workpiece support which can be fastened to said receiving device and has a clamping device, via which a workpiece to be machined is fastened to said workpiece support, said workpiece support comprising a monitoring device configured to monitor a state of stress of said clamping device;

wherein said support device and the workpiece support fastened to said receiving device are electrically coupled to one another via a contactless information transmission interface such that said monitoring device of the fastened workpiece support can transmit information about a state of stress monitored by said monitoring device, via said contactless information transmission interface to said support device, wherein:

said support device and said workpiece support fastened to said receiving device are configured to be coupled to one another via an energy transmission interface for the transmission of hydraulic and/or pneumatic energy between said support device and said workpiece support.

2. The system for machining workpieces according to claim 1, wherein said support device and said workpiece support can be coupled to one another via said energy transmission interface in such a way that, in a coupled state, said clamping device of the fastened workpiece support can be supplied with hydraulic and/or pneumatic energy, via said energy transmission interface.

3. The system for machining workpieces according to claim 1, wherein said monitoring device for monitoring the state of stress comprises one or more sensor units from a group of sensor units, said group of sensor units comprising:

a pressure sensor unit for sensing a hydraulic and/or a pneumatic pressure at said clamping device;

an end position sensor unit for sensing an end position of said clamping device for clamping said workpiece;

a displacement sensor unit for sensing a displacement of said clamping device; and a force sensor unit for sensing a clamping force of said clamping device acting on said workpiece.

4. The system for machining workpieces according to claim 1, wherein said energy transmission interface, in the coupled state, is further configured to transmit electrical energy between said support device and said workpiece support fastened to said receiving device to supply energy to said clamping device of the fastened workpiece support.

5. The system for machining workpieces according to claim 1, wherein said support device is configured to establish and/or release a coupling between said support device and the fastened workpiece support via said energy transmission interface by relative movements between a support device side part and a workpiece support side part of said energy transmission interface.

6. The system for machining workpieces according to claim 5, wherein said support device is configured to establish and/or release the coupling between said support device and the fastened workpiece support via said energy transmission interface by translational movements of the support device side part of said energy transmission interface in a direction of a movement axis of said receiving device.

7. The system for machining workpieces according to claim 5, wherein said system is configured such that the coupling between said support device and the fastened workpiece support via said energy transmission interface is released during the workpiece machining.

8. The system for machining workpieces according to claim 5, wherein said system is configured such that the coupling between said support device and the fastened workpiece support is established via said energy transmission interface during the workpiece machining.

9. The system for machining workpieces according to claim 8, wherein said support device and said base of the machine tool are coupled to one another via a further energy transmission interface for the transmission of hydraulic and/or pneumatic and/or electrical energy such that, between said support device and said base during the workpiece machining, energy can be transmitted via the further energy transmission interface via said energy transmission interface between said support device and said workpiece support.

10. The system for machining workpieces according to claim 9, wherein a part of the further energy transmission interface is configured as a rotary feedthrough with a sealed transition between said support device and a hydraulic fluid supply and/or a gas supply and/or a vacuum supply arranged on the side of said base of the machine tool.

11. The system for machining workpieces according to claim 1, wherein a support device side part of said contactless information transmission interface substantially retains its position relative to said base of the machine tool during the rotation of said receiving device in the course of the workpiece machining.

12. The system for machining workpieces according to claim 11, wherein the support device side part and the workpiece support side part of said contactless information transmission interface are each configured as inductive couplers configured to inductively transmit information to one another in a form of electrical signals across an air gap.

13. The system for machining workpieces according to claim 1, said support device is electrically coupled to a control device of the machine tool arranged on a side of said base via a contactless second information transmission interface, wherein the contactless second information transmission interface is configured to transmit information in a form of electrical signals between said support device and the control device, the information including information transmitted via said contactless information transmission interface regarding a state of stress of said clamping device monitored by said monitoring device.

14. The machine tool for use in the system for machining workpieces according to claim 1.

15. The support device for use in the machine tool according to claim 14.

16. The workpiece support for use in the system for machining workpieces according to claim 1.

17. The system for machining workpieces according to claim 3, wherein sensing the end position of said clamping device includes sensing the end position of clamping jaws included in said clamping device.

18. The system for machining workpieces according to claim 6, wherein the movement axis is the axis of rotation.

19. The system for machining workpieces according to claim 9, wherein the energy that can be transmitted via the further energy transmission interface can supply energy to said clamping device.

* * * * *